United States Patent
Tanabe et al.

(10) Patent No.: US 6,387,833 B1
(45) Date of Patent: May 14, 2002

(54) SEALING COMPOSITION

(75) Inventors: Ryuichi Tanabe; Hiroshi Usui, both of Kanagawa; Yutaka Segawa; Yuichi Kuroki, both of Chiba; Eiji Ichikura, Kanagawa, all of (JP)

(73) Assignee: Asahi Glass Company, Limited, Tokyo (JP)

( * ) Notice: Subject to any disclaimer, the term of this patent is extended or adjusted under 35 U.S.C. 154(b) by 59 days.

(21) Appl. No.: 09/631,114

(22) Filed: Aug. 2, 2000

(30) Foreign Application Priority Data

Aug. 13, 1999 (JP) .......................... 11-229443

(51) Int. Cl.$^7$ .......................... C03C 3/074; C03C 8/10; C03C 8/16; C03C 8/20
(52) U.S. Cl. .......................... 501/18; 501/20; 501/22; 501/26; 501/32; 501/76; 313/477 R; 220/2.1 A
(58) Field of Search .......................... 501/15, 17, 18, 501/20, 22, 26, 32, 76, 77; 220/2.1 A; 313/477 R

(56) References Cited

U.S. PATENT DOCUMENTS

| | | |
|---|---|---|
| 3,973,975 A | 8/1976 | Francel et al. |
| 4,038,091 A | 7/1977 | Francel et al. |
| 4,098,611 A | 7/1978 | Francel et al. |
| 4,099,977 A | 7/1978 | Francel et al. |
| 4,120,678 A | 10/1978 | Francel et al. |
| 5,470,804 A | 11/1995 | Morena |
| 5,683,948 A | 11/1997 | Tanabe et al. |
| 5,821,182 A | 10/1998 | Tanabe et al. |
| 5,916,832 A | 6/1999 | Tanabe et al. |

FOREIGN PATENT DOCUMENTS

JP    2000-119040 A   *  4/2000

* cited by examiner

*Primary Examiner*—David Sample
(74) *Attorney, Agent, or Firm*—Oblon, Spivak, McClelland, Maier & Neustadt, P.C.

(57) ABSTRACT

A sealing composition having at least one member from $\alpha$-4PbO.B$_2$O$_3$ crystal powder and Pb$_3$O$_4$ powder incorporated in a total amount of from 0.0001 to 3 parts by weight to 100 parts by weight of a composition comprising at least 80 wt % and less than 98.99 wt % of a powder of PbO—ZnO—B$_2$O$_3$—SiO$_2$ type crystalline low melting point glass, from 0.01 to 5 wt % of a zircon powder, more than 1 wt % and not more than 19.99 wt % of an $\alpha$-alumina powder and from 0 to 10 wt % of a low expansion ceramic filler.

11 Claims, No Drawings

SEALING COMPOSITION

The present invention relates to a sealing composition useful for sealing a panel and a funnel of a color cathode ray tube.

A panel and a funnel of a color cathode ray tube used to be sealed by means of a sealing composition containing PbO—ZnO—$B_2O_3$—$SiO_2$ type low melting point glass. Namely, such a sealing composition is formed into a paste, which is then coated on the sealing portion and maintained at a temperature of from 440 to 4700° C. for from 30 to 40 minutes, whereby the panel and the funnel will be sealed. The interior of the sealed panel and funnel (i.e. a bulb of a color cathode ray tube) will then be evacuated to a high vacuum level of not higher than $10^{-6}$ Torr at a high temperature of from 300 to 380° C.

As such a sealing composition, JP-A-8-225341 discloses a sealing composition comprising PbO—ZnO—$B_2O_3$—$SiO_2$ type low melting point glass and 4 wt % of an alumina powder.

In recent years, along with the progress in the trend for large size and flat panel of a color cathode ray tube, the weight of a bulb of a color cathode ray tube has increased (such a weight tends to be further increased, since it is necessary to further increase the glass thickness in order to prevent deterioration of the strength of the bulb of a color cathode ray tube due to the use of a flat panel). Under these circumstances, it is desired to reduce the weight of the bulb of a color cathode ray tube.

In order to reduce the weight of the bulb of a large sized color cathode ray tube, it is necessary to reduce the glass thickness of the panel and the funnel. However, there has been a problem that if the glass thickness is reduced, the strength at the sealing portion of the panel and the funnel decreases.

It is an object of the present invention to solve the above problems and to provide a sealing composition which is capable of improving the strength of the sealed product (such as a bulb of a color cathode ray tube).

The present invention provides a sealing composition having at least one member from $\alpha$-$4PbO.B_2O_3$ crystal powder and $Pb_3O_4$ powder incorporated in a total amount of from 0.0001 to 3 parts by weight to 100 parts by weight of a composition comprising at least 80 wt % and less than 98.99 wt % of a powder of PbO—ZnO—$B_2O_3$—$SiO_2$ type crystalline low melting point glass, from 0.01 to 5 wt % of a zircon powder, more than 1 wt % and not more than 19.99 wt % of an $\alpha$-alumina powder and from 0 to 10 wt % of a low expansion ceramic filler.

Now, the present invention will be described in detail with reference to the preferred embodiments.

The sealing composition of the present invention is usually mixed with a vehicle to obtain a paste. Such a vehicle may, for example, be a solution having nitrocellulose dissolved in isoamyl acetate. The paste is coated, for example, at a portion where a panel and a funnel of a color cathode ray tube are to be sealed, and then baked. In such a case, the baking is carried out for example, by maintaining the coated paste at a temperature of from 400 to 450° C. for from 30 to 40 minutes.

In the present invention, crystalline glass is a glass which shows a heat generation peak in a differential thermal analysis wherein the temperature is raised at a rate of 10° C./min and maintained at from 350 to 500° C. for 2 hours. Namely, it is a glass which crystallizes under the above conditions. It is preferably a glass which shows a heat generation peak in a differential thermal analysis wherein the temperature is raised at a rate of 10° C./min and maintained at a temperature of from 400 to 450° C. for 2 hours.

In the present invention, low melting point glass is a glass having a softening point of not higher than 600° C.

In the present invention, PbO—ZnO—$B_2O_3$—$SiO_2$ type crystalline low melting point glass is a crystalline glass which contains PbO, ZnO, $B_2O_3$ and $SiO_2$ and wherein, when it is maintained at a temperature of from 350 to 500° C., first crystals ($2PbO.ZnO.B_2O_3$) will appear as the time passes and then second crystals ($\alpha$-$4PbO.B_2O_3$) will precipitate. Preferably, it is a glass, wherein, when maintained at a temperature of from 400 to 450° C., the first crystals and the second crystals will precipitate as described above.

In the present invention, a low expansion ceramic filler is a ceramic powder having an average linear expansion coefficient within a range of from room temperature to 300° C. (hereinafter referred to simply as an expansion coefficient) being not higher than $70 \times 10^7/°$ C. However, zircon powder and $\alpha$-alumina powder are excluded.

In the sealing composition of the present invention, the low expansion ceramic filler is preferably at least one member selected from the group consisting of cordierite, mullite, lead titanate, silica, $\beta$-eucryptite, $\beta$-spodumene and $\beta$-quartz solid solution, from the viewpoint of handling efficiency.

The interior of the panel and the funnel of a color cathode ray tube, sealed by means of the sealing composition of the present invention, is evacuated usually to a high vacuum level of not higher than $10^{-6}$ Torr at a high temperature of from 300 to 380° C. At that time, the baked sealing composition of the present invention is free from flowing or foaming.

The expansion coefficient of the baked sealing composition of the present invention (hereinafter referred to as the baked product) is preferably from $70 \times 10^{-7}$ to $110 \times 10^{-7}/°$ C., more preferably from $80 \times 10^{-7}$ to $110 \times 10^{-7}/°$ C., particularly preferably from $85 \times 10^{-7}$ to $105 \times 10^{-7}/°$ C., most preferably from $90 \times 10^{-7}$ to $100 \times 10^{-7}/°$ C., to adjust it to the expansion coefficients of the panel and the funnel of a color cathode ray tube.

Now, the composition of the sealing composition of the present invention will be described, wherein wt % will be represented simply by %.

The PbO—ZnO—$B_2O_3$—$SiO_2$ type crystalline low melting point glass powder is a component which provides fluidity and is essential. If it exceeds 98.99%, the expansion coefficient of the baked product tends to be too large, whereby the sealing portion is likely to break. It is preferably at most 98%. If it is less than 80%, the fluidity tends to be low, and the air tightness of the sealing portion is likely to be low. Preferably, it is at least 85%, more preferably at least 90%.

The zircon powder is a component which accelerates crystallization thereby to shorten the baking time or lowers the expansion coefficient of the baked product to a prescribed level, and thus it is essential. If it exceeds 5%, the fluidity tends to be too low. Preferably, it is at most 1%, more preferably at most 0.5%. If it is less than 0.01%, its effects tend to be too small. Preferably, it is at least 0.05%.

The $\alpha$-alumina powder is a component which increases the strength and lowers the expansion coefficient of the baked product to a prescribed level, and it is essential. If it exceeds 19.99%, the fluidity tends to be too low. Preferably, it is at most 15%, more preferably at most 10%. If it is less than 1%, its effects tend to be too small. Preferably, it is at least 1.5%, more preferably more than 2%, particularly preferably at least 2.5%, most preferably more than 4%.

The low expansion ceramic filler is a component which lowers the expansion coefficient of the baked product to a prescribed level, and it may be incorporated up to 10%. If it exceeds 10%, the fluidity is likely to be low. More preferably, it is at most 7%, particularly preferably at most 5%, most preferably at most 2%.

The α-4PbO.B$_2$O$_3$ crystalline powder and the Pb$_3$O$_4$ powder are seed crystals for crystallization of the crystalline low melting point glass powder, and they accelerate precipitation of the second crystals (α-4PbO.B$_2$O$_3$). It is essential that at least either component is incorporated. By the precipitation of the second crystals, precipitation of PbO crystals will be suppressed. Precipitation of PbO crystals deteriorates the electrical insulating property of the sealing portion of the panel and the funnel.

Such an electrical insulating property is evaluated by a current (leak current) flowing between the exterior and the interior of the sealing portion when a voltage (30,0000 V) is applied across the exterior and the interior of the sealing portion. The leak current is preferably at most 3 0 nA. He re, the interior of the sealing portion is meant for the surface of the sealing portion on the inner side of the bulb of a color cathode ray tube having the panel and the funnel sealed, and the exterior of the sealing portion is meant for the surface of the sealing portion on the exterior side of the bulb of the color cathode ray tube.

If the total content of the α-4PbO.B$_2$O$_3$ crystal powder and the Pb$_3$O$_4$ powder exceeds 3 parts by weight per 100 parts by weight of the total content of the above four components (i.e. the PbO—ZnO—B$_2$O$_3$—SiO$_2$ type crystalline low melting point glass powder, the zircon powder, the α-alumina powder and the low expansion ceramic filler), the sinterability decreases. The total content is preferably at most 1 part by weight, more preferably at most 0.3 part by weight. If it is less than 0.0001 part by weight, the effect for accelerating precipitation of the second crystals tends to be small. It is preferably at least 0.0002 part by weight, more preferably at least 0.0003 part by weight, particularly preferably at least 0.001 part by weight, most preferably at least 0.01 part by weight.

The α-4PbO.B$_2$O$_3$ crystal powder can be prepared, for example, as follows. Namely, a material prepared to have a ratio of PbO:B$_2$O$_3$=4 mol:1 mol, is melted at 900° C. for 1 hour, formed into flakes and then subjected to heat treatment at 440° C. for 1 hour, whereupon the product is pulverized in a ball mill for a predetermined period of time to obtain a powder.

The Pb$_3$O$_4$ powder may, for example, be a commercially available product.

The sealing composition of the present invention comprises the above-described components. However, other components may also be incorporated within a range not to impair the purpose of the present invention i.e. in a total amount of up to 5 parts by weight per 100 parts by weight of the composition. As such other components, pigments such as black heat resistant pigments, may, for example, be mentioned.

The PbO—ZnO—B$_2$O$_3$—SiO$_2$ type crystalline low melting point glass powder preferably comprises:

| | |
|---|---|
| PbO | 71 to 84 wt %, |
| ZnO | 8 to 16 wt %, |
| B$_2$O$_3$ | 7 to 10 wt % |
| SiO$_2$ | 1 to 3 wt %, |
| BaO | 0 to 3 wt %, |

-continued

| | |
|---|---|
| CaO | 0 to 3 wt %, |
| SrO | 0 to 3 wt %, |
| Li$_2$O | 0 to 3 wt %, |
| Na$_2$O | 0 to 3 wt %, |
| K$_2$O | 0 to 3 wt %, |
| Al$_2$O$_3$ | 0 to 5 wt %, and |
| Bi$_2$O$_3$ | 0 to 10 wt %. |

More preferably, it comprises:

| | |
|---|---|
| PbO | 71.5 to 78 wt %, |
| ZnO | 10.5 to 14.5 wt %, |
| B$_2$O$_3$ | 7 to 10 wt % |
| SiO$_2$ | 1.65 to 3 wt %, |
| BaO | 0.1 to 1.85 wt %, |
| CaO | 0 to 1.5 wt %, |
| SrO | 0 to 1.5 wt %, |
| Li$_2$O | 0 to 3 wt %, |
| Na$_2$O | 0 to 3 wt %, |
| K$_2$O | 0 to 3 wt %, |
| Al$_2$O$_3$ | 0 to 5 wt %, and |
| Bi$_2$O$_3$ | 0 to 10 wt %. |

The total content of BaO, CaO and SrO is preferably from 0.1 to 1.85 wt %, and the weight ratio of ZnO/PbO i.e. the weight ratio of the ZnO content to the PbO content, is preferably within a range of from 0.14 to 0.20.

The above compositions will be described below wherein wt % will be represented simply by %.

If the content of PbO is less than 71%, the softening point tends to be too high, whereby the fluidity deteriorates, the strength is likely to decrease and/or the air tightness of the sealing portion tends to deteriorate. It is preferably at least 71.5%, more preferably at least 74.5%. If it exceeds 84%, the softening point tends to be too low, and it tends to be difficult to make the temperature rising rate sufficiently large during exhaust. It is preferably at most 78%, more preferably at most 77%, particularly preferably at most 76%.

If the content of ZnO is less than 8%, the softening point tends to be too high, and crystallization tends to be difficult. It is preferably at least 9%, more preferably at least 10.5%, particularly preferably at least 11.5%, most preferably at least 12.1%. If it exceeds 16%, devitrification is likely to result during is the melting of glass. It is preferably at most 14.5%, more preferably at most 13.5%.

The weight ratio of ZnO/PbO i.e. the weight ratio of the ZnO content to the PbO content, is a parameter to satisfy both sealing in a short period of time and a high temperature rising rate during exhaust, and it is preferably within a range of from 0.14 to 0.20. If it is less than 0.14, the temperature rising rate during exhaust may not be made sufficiently large. It is more preferably at least 0.15. If it exceeds 0.20, the fluidity tends to decrease, and the strength tends to decrease. Further, crystallization tends to be difficult, and sealing in a short period of time tends to be difficult. More preferably, it is at most 0.18.

If the content of B$_2$O$_3$ is less than 7%, the softening point tends to be too high, and the fluidity tends to decrease. It is preferably at least 8%. If it exceeds 10%, the chemical durability tends to deteriorate. It is preferably at most 9.5%.

The content of SiO$_2$ is an important parameter to make it possible to increase the temperature rising rate during exhaust. If it is less than 1%, the crystallization rate tends to be too large, and it tends to be difficult to make the temperature rising rate during exhaust sufficiently large. It is preferably at least 1.65%, more preferably at least 1.7%. In the vicinity of the upper limit within the allowable range of the content, the properties may not change so drastically as in the vicinity of the lower limit. However, if it exceeds 3%, the softening point tends to be too high, and the fluidity tends to decrease. Preferably, it is at most 2.5%.

BaO is not essential, but may be contained up to 3% in order to satisfy both sealing in a short period of time and a high temperature rising rate during exhaust. If it exceeds 3%, the crystallization rate tends to be too small, and sealing can not be carried out in a short period of time. It is more preferably at most 1.85%, particularly preferably at most 1.80%. When it is desired to further increase the temperature rising rate during exhaust, BaO is preferably incorporated in an amount of at least 0.1%, more preferably at least 0.6%.

CaO and SrO are not essential, but may be incorporated up to 3% each in order to improve the melting property of the glass. If the content exceeds 3%, the crystallization rate tends to be too small. More preferably, each content is at most 1.5%.

The total amount of BaO, CaO and SrO is preferably from 0.1 to 1.85% in order to improve the adhesion property. If it is less than 0.1%, the adhesion property may not be improved. Preferably, it is at least 0.5%. If the total amount exceeds 1.85%, the crystallization rate tends to be too small. More preferably, it is at most 1.8%.

$Li_2O$, $Na_2O$ and $K_2O$ are not essential, but may be incorporated up to 3% each in order to improve the melting property of the glass. If either one exceeds 3%, the electrical insulating property is likely to deteriorate.

$Al_2O_3$ is not essential, but may be incorporated up to 5% in order to improve the chemical durability. If it exceeds 5%, the fluidity is likely to deteriorate.

$Bi_2O_3$ is not essential, but may be incorporated up to 10% in order to improve the fluidity. If it exceeds 10%, the crystallization tends to be poor.

The $PbO$—$ZnO$—$B_2O_3$—$SiO_2$ type crystalline low melting point glass powder preferably comprises the above-described components. However, it may contain other components in a total amount of up to 3% within a range not to impair the purpose of the present invention. As such other components, a colorant such as $Fe_2O_3$ may, for example, be mentioned.

Further, it is preferred not to contain a halogen, especially fluorine, since a halogen, especially fluorine, is likely to gasify during the use of a color cathode ray tube and deteriorate the characteristics of an electron gun of the color cathode ray tube (emission slump phenomenon).

Now, a bulb of a color cathode ray tube sealed by the sealing composition of the present invention (hereinafter referred to simply as the bulb) will be described.

The bulb is produced by mixing the sealing composition of the present invention with a vehicle to obtain a paste, and coating this paste on the portions of the panel and the funnel to be sealed, followed by baking.

The average linear expansion coefficient (hereinafter referred to as the JIS expansion coefficient) within a range of from 0° C. to 300° C. of the panel and the funnel to be used for the bulb, is measured in accordance with the provisions of JIS R3102 and is preferably within a range of from $97 \times 10^{-7}$ to $99 \times 10^{-7}$/° C.

Of the bulb, the strength (the sealing strength) of the portion having the panel and the funnel sealed, is measured by a four point flexural strength test method which will be described hereinafter. The measurements are carried out eight times, and the average value is taken as the sealing strength.

(1) A test piece of 60 mm×30 mm×9 mm is taken from each of the panel and the funnel, and the surface of 60 mm×9 mm is polished for mirror finishing. On the other hand, the sealing composition is kneaded with a behicle to obtain a paste. As the behicle, one having 1.2% of nitrocellulose dissolved in isoamyl acetate, is employed.

(2) The paste is coated on the mirror finished surface of the funnel test piece, and the panel test piece is placed thereon so that the mirror-finished surface thereof will face the paste-coated surface, and this assembly is fired in an electric furnace to bond the panel test piece and the funnel test piece.

(3) A test piece (5 mm×60 mm×9 mm) having a width of 5 mm in a direction perpendicular to the bonded surface of the above bonded test pieces, is cut out and used as a strength test piece.

(4) Using the above strength test piece, four point flexural strength test (upper span: 20 mm, lower span: 50 mm, crosshead speed: 0.1 mm/min) is carried out, and the strength is calculated.

If the sealing strength is less than 500 kgf/cm$^2$, it is difficult to reduce the weight of the bulb of a color cathode ray tube. Preferably, it is at least 520 kgf/cm$^2$.

If the electric current (leak current) flowing between the exterior and the interior of the sealing portion of the panel and the funnel exceeds 30 nA when 30,000 V is applied across the exterior and interior of the sealing portion of the bulb, the sealing portion is likely to undergo dielectric breakdown.

Now, the present invention will be described in further detail with reference to Examples. However, it should be understood that the present invention is by no means restricted to such specific Examples.

EXAMPLES 1 TO 8

Starting materials were prepared and mixed in accordance with conventional methods, and they were melted and vitrified at a temperature of from 1,000 to 1,200° C. Then, the vitrified product was subjected to water granulation or passed through rollers to form flakes. Then, the flakes were pulverized by a ball mill for a predetermined period of time to obtain a powder of glass having a composition shown by wt % in the rows for from PbO to BaO in Table 1. In the row for ZnO/PbO in Table 1, the weight ratio of the ZnO content to the PbO content, is shown. The softening points of glasses thus prepared are all not higher than 600° C., as shown by ° C. in Table 1. Further, when these glass powders were maintained at a temperature of from 400 to 450° C., first crystals ($2PbO.ZnO.B_2O_3$) appeared as the time passed, and then second crystals ($\alpha$-$4PbO.B_2O_3$) precipitated.

Then, this glass powder, a zircon powder, an $\alpha$-alumina powder, a low expansion ceramic filler and a $Pb_3O_4$ powder were mixed in the weight ratio shown in the rows for from glass to $Pb_3O_4$ in Table 1, to prepare a sealing composition. Examples 1 to 5 are Working Examples of the invention and Examples 6 to 8 are Comparative Examples. In Table 1, $\beta$-eucr, $\beta$-spod and $\beta$-quartz represent $\beta$-eucryptite, $\beta$-spodumene and $\beta$-quartz solid solution, respectively.

With respect to such a sealing composition, the flow button diameter (unit: mm), the bond residual strain (unit: nm/cm$^2$) and the expansion coefficient (unit: $10^{-7}$/° C.) were measured.

Further, this sealing composition was placed between a funnel (JIS expansion coefficient: $98 \times 10^{-7}$/° C.) and a panel (JIS expansion coefficient: $98 \times 10^{-7}$/° C.) of a 25 model or 29 model color cathode ray tube and maintained for 35 minutes at a baking temperature (unit: ° C.) as identified in Table 1, to obtain a bulb having the funnel and the panel sealed. With respect to this bulb, the bulb pressure strength (unit: kgf/cm$^2$), the heat resisting strength (unit: ° C.), the maximum temperature raising rate during exhaust (unit: ° C./min), the sealing strength (unit: kgf/cm$^2$) and the electrical insulating property were measured and evaluated. The results of the measurements and evaluations are shown in Table 1. The respective measuring and evaluation methods are as follows.

Flow button diameter: This indicates the fluidity at the time of sealing (at the time of baking). 10 g of a sample powder of a sealing composition was press-molded into a cylinder having a diameter of 12.7 mm and then maintained at a firing temperature (unit: ° C.) shown in Table 1 for 35 minutes, whereupon the diameter of the obtained substantially circular fired product is taken as the flow button diameter. It is preferably at least 26 mm.

Mismatch at room temperature: A sealing composition and a behicle (a solution having 1.2% of nitrocellulose dissolved in isoamyl acetate) were mixed in a weight ratio of 11.5:1 to obtain a paste. This paste was coated on a funnel glass piece and fired under the same conditions as in the case for the flow button diameter, whereupon the residual strain (compression strain) formed between the funnel glass piece and the sealing composition was measured by means of a polarimeter. It is preferably at most 400 nm/cm.

Expansion coefficient: A sealing composition was baked under the same conditions as in the case for the flow button diameter and then polished into a predetermined size, whereupon the elongation was measured by a heat expansion measuring apparatus under a condition of a temperature raising rate of 10° C./min, and an average linear expansion coefficient within a range of from room temperature to 300° C. was calculated. It is preferably within a range of from $70 \times 10^{-7}$ to $110 \times 10^{-7}$/° C.

Bulb pressure strength: A pressure difference by water was given between the interior and the exterior of a 25 model bulb, and the pressure difference at breakage was measured. Such measurement was repeated 5 times, and the average value was calculated. To guarantee the strength as a bulb, it is preferably at least 4.6 kgf/cm$^2$, more preferably at least 4.7 kgf/cm$^2$, particularly preferably at least 4.8 kgf/cm$^2$.

Heat resisting strength: A temperature difference was given by water and hot water between the interior and the exterior of a 25 model bulb, and the temperature difference at breakage was measured. This measurement was repeated 5 times, and the average value was calculated. Taking into consideration, the thermal stress formed in the heat treatment step for the production of a color cathode ray tube, it is preferably at least 45° C.

Maximum temperature raising rate for exhaust: While exhaust the interior of a 29 model bulb by means of a vacuum pump and maintaining the pressure at $10^{-6}$ Torr, the temperature was raised at various temperature raising rates, and the maximum temperature raising rate at which the bulb did not break, was obtained. This is an index for the upper limit in the temperature raising rate in the exhaust step for a bulb. It is preferably at least 15° C./min.

Sealing strength: Using a strength test piece prepared by baking at a baking temperature shown in Table 1, the sealing strength was measured by a four point flexural strength test method.

Electrical insulating property: A leak current was measured when 30,000 V was applied across the interior and the exterior of the sealing portion. One having not more than 30 nA was represented by ○.

The bulbs sealed by means of the sealing compositions of Examples 1 to 4, had high bulb pressure strength and heat resisting strength, and the maximum temperature raising rate for exhaust was also sufficiently high. On the other hand, with the bulbs sealed by means of the sealing compositions of Examples 6 to 8, their bulb pressure strength and heat resisting strength were low.

TABLE 1

| | Examples | | | | | | | |
|---|---|---|---|---|---|---|---|---|
| | 1 | 2 | 3 | 4 | 5 | 6 | 7 | 8 |
| PbO | 76.0 | 75.9 | 75.8 | 75.9 | 75.5 | 75.4 | 76.2 | 75.2 |
| ZnO | 12.1 | 12.0 | 12.0 | 11.9 | 12.3 | 12.1 | 11.7 | 12.0 |
| B$_2$O$_3$ | 8.8 | 8.8 | 8.6 | 8.8 | 8.6 | 8.5 | 8.9 | 8.7 |
| SiO$_2$ | 2.1 | 1.8 | 1.9 | 1.8 | 1.8 | 2.0 | 2.0 | 2.1 |
| BaO | 1.0 | 1.5 | 1.7 | 1.6 | 1.8 | 2.0 | 1.2 | 2.0 |
| ZnO/PbO | 0.159 | 0.158 | 0.158 | 0.157 | 0.164 | 0.160 | 0.154 | 0.160 |
| Softening point | 384 | 386 | 388 | 385 | 389 | 393 | 383 | 395 |
| Glass | 95.9 | 92.9 | 89.95 | 94.85 | 96.85 | 99.4 | 97.8 | 93.6 |
| Zircon | 0.3 | 0.1 | 0.05 | 0.15 | 0.15 | 0.6 | 0.2 | 0.4 |
| α-alumina | 3.0 | 7.0 | 10.0 | 5.0 | 3.0 | | 2.0 | 6.0 |
| Silica | 0.3 | | | | | | | |
| β-eucr | 0.3 | | | | | | | |
| β-spod | 0.1 | | | | | | | |
| β-quartz | 0.1 | | | | | | | |
| Pb$_3$O$_4$ | 0.05 | 0.20 | 0.15 | 0.10 | 0.15 | | | |
| Firing temperature | 450 | 440 | 440 | 440 | 440 | 440 | 440 | 440 |
| Flow button diameter | 27.1 | 26.7 | 26.8 | 27.2 | 26.8 | 27.0 | 26.6 | 26.8 |
| Mismatch at room temperature | 120 | 200 | 250 | 190 | 82 | 20 | 35 | 75 |
| Expansion coefficient | 92 | 91 | 88 | 92 | 95 | 97 | 96 | 95 |
| Bulb pressure strength | 4.8 | 5.2 | 4.9 | 5.0 | 4.8 | 3.2 | 3.9 | 4.1 |
| Heat resisting strength | 53 | 54 | 52 | 51 | 51 | 41 | 43 | 41 |
| Maximum temperature raising rate | ≧15 | ≧15 | ≧15 | ≧15 | ≧15 | ≧15 | ≧15 | ≧15 |
| Sealing strength | | 520 | | 530 | 520 | 440 | | |
| Electrical insulating property | ○ | ○ | ○ | ○ | ○ | | | |

By using the sealing composition of the present invention, it is possible to provide a bulb of a color cathode ray tube having high strength, whereby it is possible to reduce the weight of the color cathode ray tube (inclusive of one having a flat panel). Further, it is possible to shorten the time required for exhaust of the bulb, whereby the production cost can be reduced.

What is claimed is:

1. A sealing composition having at least one member from α-4PbO.B$_2$O$_3$ crystal powder and Pb$_3$O$_4$ powder incorporated in a total amount of from 0.0001 to 3 parts by weight to 100 parts by weight of a composition comprising at least 80 wt % and less than 98.99 wt % of a powder of PbO—ZnO—B$_2$O$_3$—SiO$_2$ type crystalline low melting point glass, from 0.01 to 5 wt % of a zircon powder, more than 1 wt % and not more than 19.99 wt % of an α-alumina powder and from 0 to 10 wt % of a low expansion ceramic filler.

2. The sealing composition according to claim 1, wherein the crystalline low melting point glass comprises:

| | |
|---|---|
| PbO | 71 to 84 wt %, |
| ZnO | 8 to 16 wt %, |
| B$_2$O$_3$ | 7 to 10 wt % |
| SiO$_2$ | 1 to 3 wt %, |
| BaO | 0 to 3 wt %, |
| CaO | 0 to 3 wt %, |
| SrO | 0 to 3 wt %, |
| Li$_2$O | 0 to 3 wt %, |
| Na$_2$O | 0 to 3 wt %, |
| K$_2$O | 0 to 3 wt %, |
| Al$_2$O$_3$ | 0 to 5 wt %, and |
| Bi$_2$O$_3$ | 0 to 10 wt %. |

3. The sealing composition according to claim 1, wherein the low expansion ceramic filler is at least one member selected from the group consisting of cordierite, mullite, lead titanate, silica, β-eucryptite, β-spodumene and β-quartz solid solution.

4. The sealing composition according to claim 2, wherein the low expansion ceramic filler is at least one member selected from the group consisting of cordierite, mullite, lead titanate, silica, β-eucryptite, β-spodumene and β-quartz solid solution.

5. The sealing composition as claimed in claim 1, further comprising a black heat resistant pigment.

6. A paste comprising the sealing composition as claimed in claim 1 and a vehicle.

7. The paste as claimed in claim 6, wherein the vehicle is a solution containing nitrocellulose dissolved in isoamyl acetate.

8. The sealing composition as claimed in claim 1, wherein the crystalline low melting point glass has a softening point of not higher than 600° C.

9. The sealing composition as claimed in claim 1, wherein a weight ratio of ZnO/PbO is within a range of 0.14 to 0.20.

10. The sealing composition as claimed in claim 1, wherein a total amount of BaO, CaO and SrO is from 0.1 to 1.85%.

11. A bulb obtained by coating the paste claimed in claim 6 on one or more portions of a panel and a funnel, contacting said panel and said funnel and baking said panel in contact with said funnel.

* * * * *